J. L. KNIGHT & S. SMITH.
Adjustable Wash Bowl.
No. 9,355. Reissued Aug. 24, 1880.
FIG. 2.
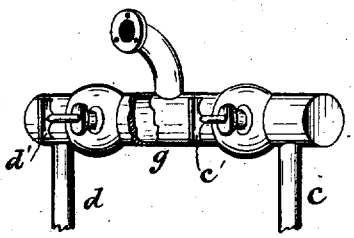
FIG. 3.
FIG. 1.
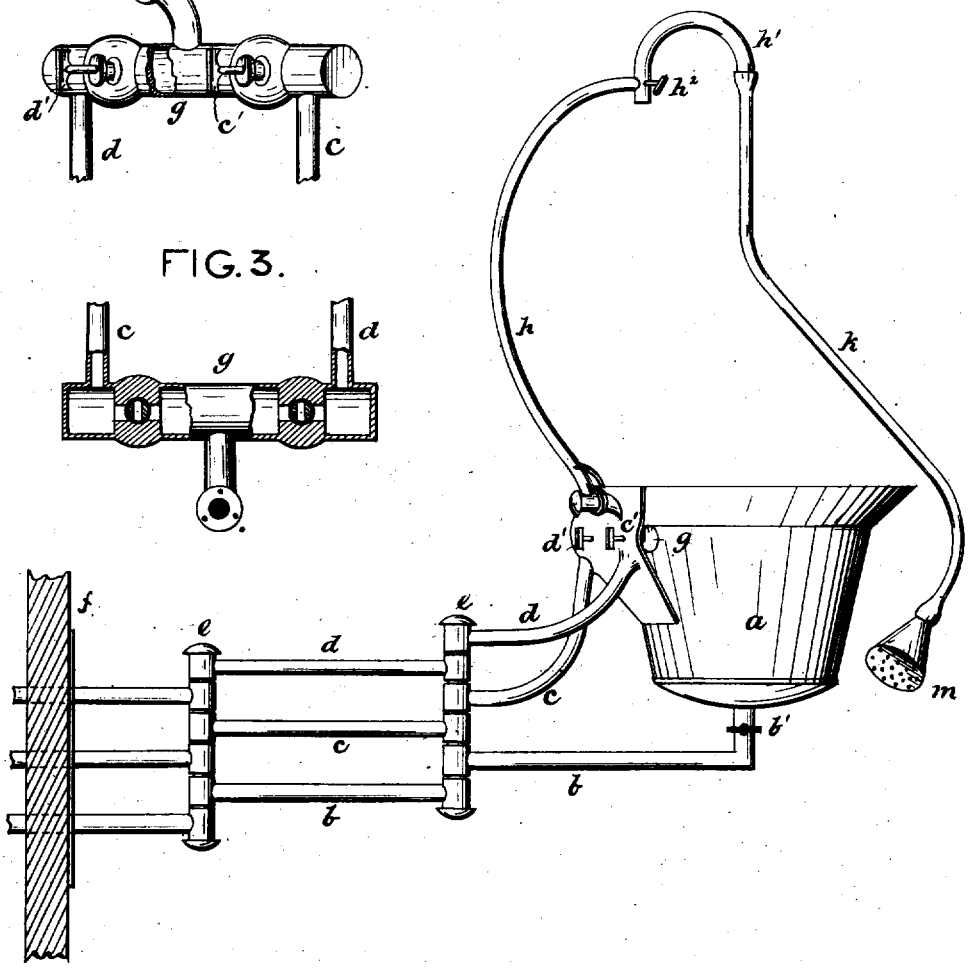
Witnesses:
Clement M. Sites.
Perry B. Turpin
Inventors:
J. Lee Knight,
Scott Smith,
By R. S. & A. L. Lacey, Att'ys.
N. PETERS, PHOTO-LITHOGRAPHER, WASHINGTON, D. C.

UNITED STATES PATENT OFFICE.

J. LEE KNIGHT AND SCOTT SMITH, OF TOPEKA, KANSAS.

ADJUSTABLE WASH-BOWL.

SPECIFICATION forming part of Reissued Letters Patent No. 9,355, dated August 24, 1880.

Original No. 220,156, dated September 30, 1879. Application for reissue filed June 9, 1880.

*To all whom it may concern:*

Be it known that we, J. LEE KNIGHT and SCOTT SMITH, citizens of the United States, and residing at Topeka, in the county of Shawnee and State of Kansas, have invented certain new and useful Improvements in Adjustable Wash-Bowls; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention has for its object to furnish an adjustable wash-bowl, adapted particularly for barbers' use.

It consists, substantially, of a bowl supported at a suitable distance above the floor, and so connected to the wall that it may be turned outward to the side of the barber's chair, and in having the said bowl provided with hot and cold water supply-pipes, a discharge or waste pipe, and a delivery-pipe with hose and sprinkler, the several pipes being provided with cut-offs, as will be hereinafter fully explained.

In the drawings, Figure 1 shows a bowl with the several pipes connected thereto according to our invention. Figs. 2 and 3 are detailed views, showing the connections of the hot and cold water pipes and the delivery-pipe.

*a* is the wash-bowl, which has in its bottom a waste-opening, to which is attached a waste-pipe, *b*, so arranged as to permit the bowl to be moved to or from the wall without interfering with the flow of water through said waste-pipe. The waste-pipe may be provided with a stop-cock, *b'*; or, in lieu of the stop-cock, a plug of ordinary form may be employed, and inserted in the opening in the bottom of the bowl.

*c* and *d* are hot and cold water supply pipes, made of suitable material, and so arranged as to carry the water from the service-pipes or reservoirs to the tempering-chamber *g* on the side of the bowl *a*, whether the bowl be folded back against the wall or drawn out to any point within the radius of its supporting-arm.

The inner ends of the water-pipes *c d* are connected with the hot and cold water service-pipes of the building, or with convenient reservoirs, and the outer ends are connected with the tempering-chamber *g*.

The waste-pipe *b*, opening from the bottom of the bowl *a* at its outer end, is connected at its inner end with the sewer or receptacle for waste water.

The confluent or tempering chamber *g*, which is attached to the side of the bowl *a*, has connection at either end, respectively, with the supply-pipes *c* and *d*, the flow of water from either pipe being regulated by stop-cocks *c' d'*.

The supporting-arms may consist of any desired number of sections and joints; but for ordinary purposes three sections and two joints, *e e*, will be found sufficient.

From the portion of the tempering-chamber *g* between the stop-cocks *c'* and *d'* a stand-pipe, *h*, extends upward above the bowl *a*, so as to give ample space between the upper end, *h'*, and the said bowl *a* for a man's head. The pipe *h* is provided with a stop-cock, $h^2$, to regulate the flow of water.

Attached detachably to the end *h'* of the vertical stand-pipe *h* is a section of hose, *k*, having a sprinker, *m*, attached detachably to its outer end.

Instead of or in addition to the stand-pipe *h*, arranged as described, a spigot can be employed to run the water directly from the chamber *g* into the bowl *a*. The washing could then be done in the usual way from the water in the bowl, and after use, by opening the stop-cock in the waste-pipe *b*, or withdrawing the plug in bottom of bowl, the waste water carried away in same manner as heretofore described.

When not in use the bowl is folded or swung back against the wall *f*, where it will be out of the way.

The special use for which this adjustable wash-bowl is designed and adapted is shampooing, the object to be accomplished being to complete the operation without the person being operated on getting out of the barber's chair.

The bowl, by means of its adjustable supports, can be extended in front of or to the side of the chair. The person, by leaning forward or to one side, will bring the bowl directly under his head, after which the barber, having at hand either hot or cold water, (or any desired temperature, by means of the stop-cocks opening into the chamber *g*,) can complete the washing, and by means of the stand-pipe *h* and hose *k* apply the water at any point desired.

The stand-pipe *h* is so attached to the bowl that it may be turned down at the side of the bowl when not in use, and by this means render the device more compact.

It will readily be understood that this bowl, constructed as herein described, but omitting the stand-pipe *h* and hose *k*, would serve as a cheap adjustable wash-bowl for bed-rooms, hospitals, factories, and other places where rigid wash-stands would be objectionable on account of the space that they would necessarily occupy.

By this bowl all modern conveniences are supplied, while, when not in use, it can be compactly adjusted in a limited space, without in the least disturbing or interfering with its connections for water-supply and sewage.

Having described our invention, what we claim, and desire to secure by Letters Patent, is—

1. An adjustable wash-bowl provided with hot and cold water supply pipes and with a waste-pipe, the said pipes being made in sections and hinged together and provided with the necessary stop-cocks, substantially as and for the purpose set forth.

2. The combination, with the bowl *a*, having hot and cold water supply pipes connected therewith, of the stand-pipe *h*, connected to the said supply-pipe and provided with suitable keys or stop-cocks and sprinkler attachment *k*, substantially as and for the purpose set forth.

3. In a wash-bowl provided with and supported on a supply-pipe, the stand-pipe *h*, connected to the supply-pipe and provided with a suitable key or cut-off for regulating or shutting off the stream of water, and adapted to carry a sprinkling device, *k*, substantially as set forth.

4. The combination, with the bowl *a*, provided with the supply-pipes *c d*, of the confluent or tempering chamber *g*, substantially as and for the purposes set forth.

5. The combination, with the bowl *a*, pipes *c d*, and stand-pipe *h*, having sprinkler-pipe *k*, of the confluent or tempering chamber *g* and the necessary stop-cocks, substantially as and for the purposes set forth.

6. A wash-bowl provided with and carried by hot and cold water supply pipes, and adjustable to and from the point of its support, substantially as set forth.

7. A wash-bowl provided with a supply-pipe and with a waste-pipe, and connected to and supported on the said pipes, substantially as set forth.

In testimony that we claim the foregoing we have hereunto set our hands.

J. LEE KNIGHT.
SCOTT SMITH.

Witnesses:
H. W. CURTIS,
BISHOP CRUMRINE.